G. ZARNIKO.
SIEVE FOR DRUM MILLS.
APPLICATION FILED JULY 7, 1909.

958,348.

Patented May 17, 1910.

3 SHEETS—SHEET 1.

Witnesses

Inventor
Gerhard Zarniko

G. ZARNIKO.
SIEVE FOR DRUM MILLS.
APPLICATION FILED JULY 7, 1909.

958,348.

Patented May 17, 1910.
3 SHEETS—SHEET 2.

G. ZARNIKO.
SIEVE FOR DRUM MILLS.
APPLICATION FILED JULY 7, 1909.
958,348.
Patented May 17, 1910.
3 SHEETS—SHEET 3.
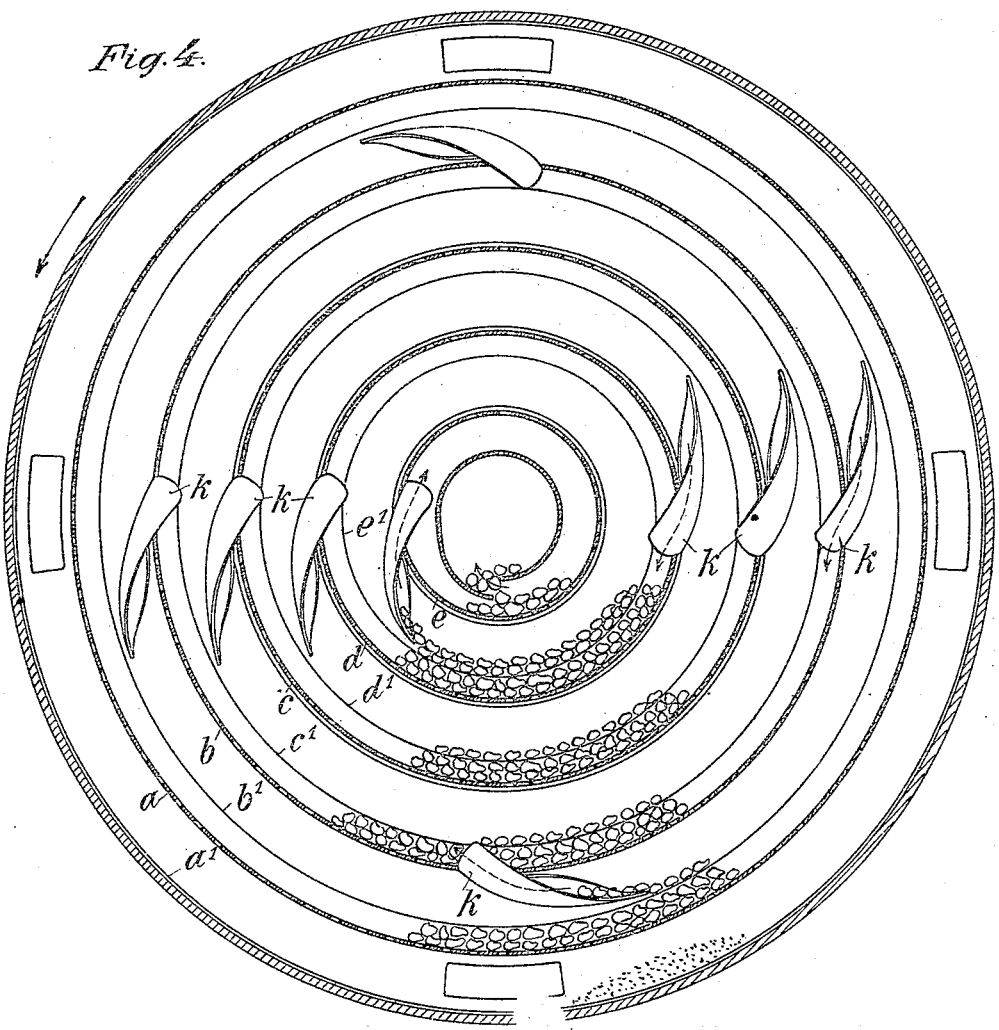

UNITED STATES PATENT OFFICE.

GERHARD ZARNIKO, OF HILDESHEIM, GERMANY.

SIEVE FOR DRUM-MILLS.

958,348.  Specification of Letters Patent.  Patented May 17, 1910.

Application filed July 7, 1909. Serial No. 506,288.

*To all whom it may concern:*

Be it known that I, GERHARD ZARNIKO, a subject of the King of Prussia, and a resident of Hildesheim, in the Kingdom of Prussia, German Empire, have invented certain new and useful Improvements in Sieves for Drum-Mills, of which the following description, in connection with the accompanying drawing, is a specification.

This invention relates to a drum mill in which the sifting of the material conveyed gradually from the periphery of the sifting chamber to the center is effected on the inner surface of concentrically arranged annular sieves, which are connected together by channels conveying inwardly the insufficiently ground material, so that during the gradual passage of the material from the periphery of the sifting chamber to its center, the material passes with uniform speed over each annular sieve. The shovel-like lower parts of the conveying channels pick up only the upper coarser particles of the stream of the material rolling on the annular sieves and convey them to the next inner annular sieve, while the fine material underneath remains on the outer sieve, where it gets continuously sifted until it is displaced by the next charge.

A sifting chamber constructed according to the present invention is illustrated in the accompanying drawings, wherein—

Figure 1:
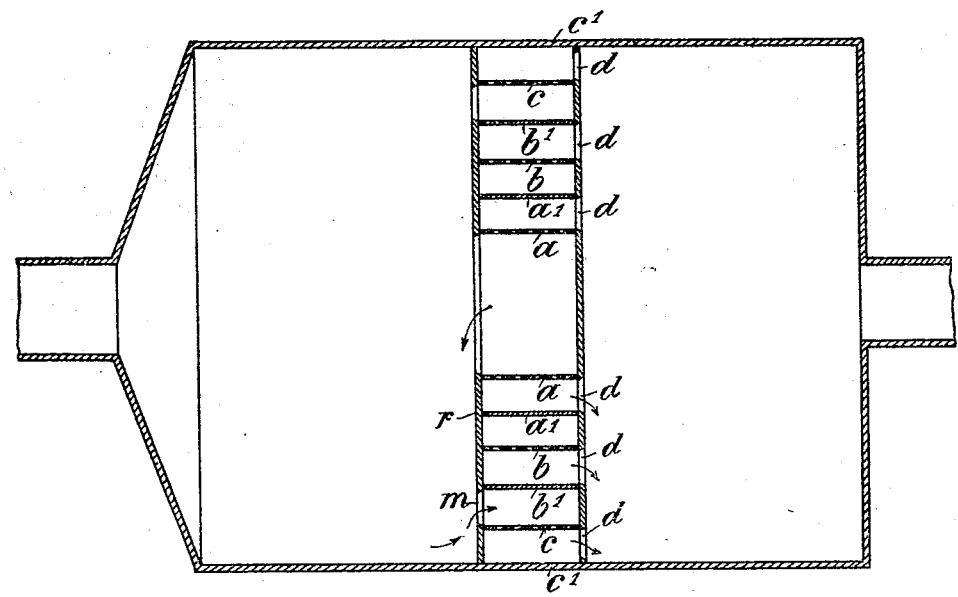
Figure 2:
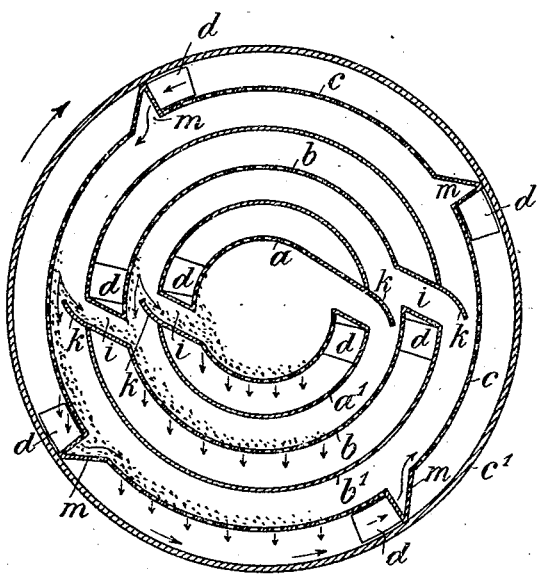
Figure 3:
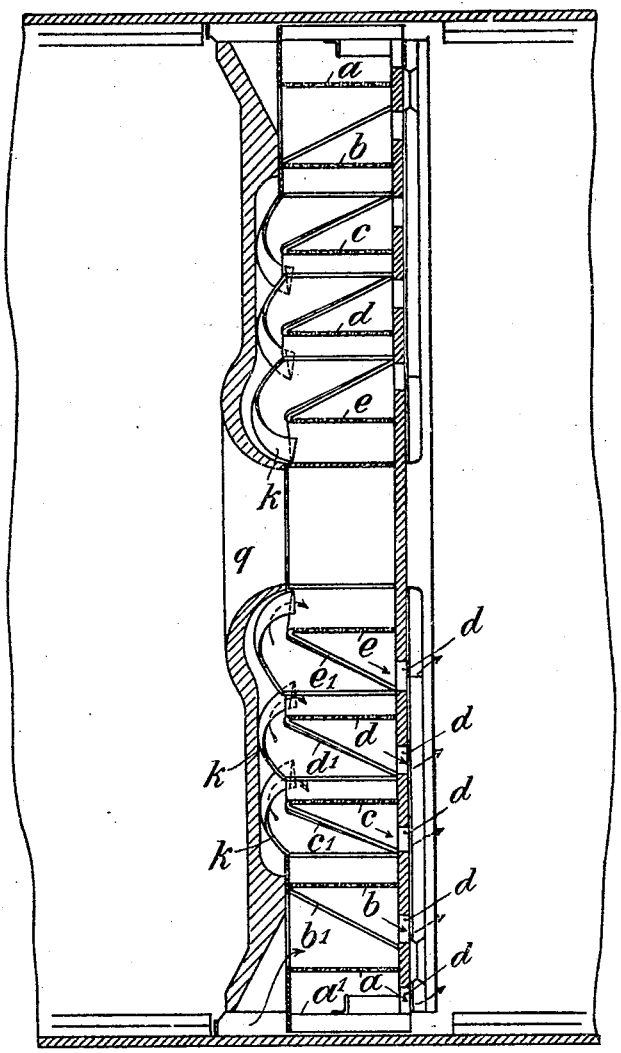

Figure 1 is a vertical section through the drum, Fig. 2 a cross section of the same, while Figs. 3 and 4 show like views respectively of a modification.

The sieve surface consists of several concentric rings $a$, $b$, $c$, between which are arranged unperforated conveying rings $a'$, $b'$, $c'$ . . . for the sifted material. The intermediate chambers formed by the annular sieves $a$, $b$, $c$, . . . and the conveying rings $a'$, $b'$, $c'$, . . ., are provided with lateral openings $d$ for the removal of the sifted material. In order to allow the coarse and incompletely ground particles collecting on the surface of the stream of material, to pass from one annular sieve to the next, there are passages $i$ in the several rings $a'$, $b'$, $c'$, . . . which form a communication between one sieve and the next. These passages have shovel-like extensions $k$, to catch the coarse particles and convey them from one sieve to the next. The material enters the outermost sieve through openings $m$ in the end wall $r$ of the drum constituting the sifting chamber.

The sieve operates as follows:—The material to be sifted passes through opening $m$ on to the outermost annular sieve $c$ and passes over the inner surface thereof with constant speed. The more finely ground particles sink to the bottom and are sifted so that they fall on to the conveying ring $c'$ below and pass through the next end opening $d$ and into the second grinding chamber. The coarser particles, on the other hand, which collect on the top are caught by the shovel $k$ as the drum continues to rotate and are passed through the passage $i$ to the next annular sieve $b$. Any material not caught by the shovel $k$ remains on the sieve until it becomes a part of the next charge and is caught by the arc of the shovels $k$. The coarser material in this manner gradually arrives at the innermost sieve $a$ and thence falls back into the first grinding chamber through a simple helical conveyer.

In the construction shown in Figs. 3 and 4 the material is also sifted on the inner surfaces of concentrically arranged annular sieves $a$, $b$, $c$, $d$, $e$ . . . between which there are unperforated conveying rings $a'$, $b'$, $c'$, $d'$, $e'$ for the sifted material, whence the material passes through the end openings $d$ into the fine grinding chamber. In this case, however, the conveyer rings $a'$, $b'$, $c'$, $d'$, $e'$ are not cylindrical but are truncated cones, so that there is an incline toward the outlet $d$ which enables the sifted grain to pass out more easily. The passages through which coarse and incompletely ground particles collecting on the top are conveyed from one sieve to the next, are not arranged in the periphery of the various conveying rings, but at the ends of the drum and have the form of suitably curved shovels $k$. In this construction interruptions of the sifting surface are avoided and the sifting area is increased. The coarse material is gradually conveyed to the center of the sieve whence it falls through opening $q$ back into the grinding chamber.

The above described constructions can also be used as a delivering device for drum mills.

Having thus described my invention and the best means I know of carrying the same into practical effect, I claim:—

1. A device of the character described, comprising a series of concentric screens, a series of intervening conveyers, and means for conveying the coarser particles from any one screen to the next inner screen.

2. A device of the character described, comprising a series of concentric screens, a series of intervening concentric conveyers, and a series of shovels adapted to convey the coarser particles successively from the outer screens to the inner screens.

3. A device of the character described, comprising a series of concentric screens, a series of intervening conveyers having a lateral dip, and means for successively conveying the coarser particles from the outer screens to the inner screens.

Signed by me at Hanover, Germany this 21st day of June 1909.

GERHARD ZARNIKO.

Witnesses:
E. T. HUTCHINGS,
R. KRIPPENDORF.